United States Patent [19]

Logan et al.

[11] 4,262,417

[45] Apr. 21, 1981

[54] TOOL FOR CLEAVING FIBER OPTIC ELEMENTS

[75] Inventors: Maurus C. Logan, Elizabeth; Peter Garner, Chatham; Nicholas T. Stancati, Mountainside, all of N.J.

[73] Assignee: Thomas & Betts Corporation, Raritan, N.J.

[21] Appl. No.: 17,344

[22] Filed: Mar. 5, 1979

[51] Int. Cl.³ .............................................. B26B 3/00
[52] U.S. Cl. .................................... 30/140; 30/164.9; 225/96
[58] Field of Search .................. 30/164.9, 164.95, 140, 30/92–97; 225/2, 96, 96.5; 83/879, 881

[56] References Cited

U.S. PATENT DOCUMENTS

| 18,918 | 12/1857 | Lloyd | 30/96 |
|---|---|---|---|
| 2,199,807 | 5/1940 | Moreira | 30/164.9 X |
| 2,317,944 | 4/1943 | Schaefer | 30/96 X |
| 2,735,175 | 2/1956 | Tallman | 30/96 X |
| 3,365,797 | 1/1968 | Cook | 30/140 |
| 4,154,385 | 5/1979 | Lewis | 225/2 X |

FOREIGN PATENT DOCUMENTS

547299  5/1977  U.S.S.R. ........................................ 225/2

Primary Examiner—Frank T. Yost
Attorney, Agent, or Firm—James J. Daley; Robert M. Rodrick; Jesse Woldman

[57] ABSTRACT

A method and tool are disclosed for use in cleaving fiber optic elements preparatory to a splice for joining of two such fiber optic elements. The method comprises the steps of first moving a grooving tool about the entire circumference of a fiber optic element to form a circumferential groove therein, and then stressing the fiber optic element in the vicinity of the groove to provide a clean, mirror type end surface of the element which is suitable for subsequent splicing thereof with another suitably prepared element. The tool which is useful in cleaving a fiber optic element comprises support means having a longitudinal axis for supporting the fiber optic element therealong, grooving means for forming a groove in the surface of the fiber optic element, and mounting means for mounting the grooving means to revolve about the longitudinal axis of the support means to circumferentially groove a fiber optic element about its entire circumference.

14 Claims, 11 Drawing Figures

TOOL FOR CLEAVING FIBER OPTIC ELEMENTS

BACKGROUND OF THE INVENTION

The present invention is directed to cleaving of fiber optic elements, and more particularly to an improved method and tool which are especially useful in cleaving fiber optic elements preparatory to subsequent splicing thereof.

In the field of fiber optics, it is often necessary to join or splice together two optic elements by abutting the ends thereof to provide a high efficiency, light coupling therebetween. An inherent problem which has existed in this field involves the achievement of extremely accurate axial alignment between the abutting ends and the achievement of clean, mirror-type surfaces for the ends of the optical fibers. For example, it is ideal that the ends of the optical fibers be cleaved or cut so that the end surface is precisely perpendicular to the longitudinal axis of the optical fiber, although up to a three degree variation is tolerable. Additionally, the end surface is ideally mirrored and extremely smooth and polished, as opposed to having a "mist" type surface, a "hackled" type surface or a spurred end. With these latter types of surfaces and ends, it is necessary to polish the end surfaces to provide for an effective and suitable end surface for splicing. The achievement of these desired objectives are further complicated by the extremely small nature of the optical fibers, the thickness of which often approximates that of a human hair.

One prior art method of cleaving fiber optic elements preparatory to a splice has been to prestress the fibers with a weight and then transversely scribe a small notch in a portion of the surface thereof perpendicular to the longitudinal direction of the fibers. The prestressing serves to cause a failure of the fiber optic element at the location of the notch. The prestressing, for example, may be accomplished by attaching a small weight, for example on the order of 150-200 grams, to the end of the fiber optic element and passing the weight over a pulley or wheel. A suitable cutting tool, for example a diamond tipped cutting element, can then traverse across the upper surface of the element to cut the notch therein.

Another prior art method has been to clamp a fiber optic element with a pair of clamps and then move a cutting tool across a portion of the surface thereof to form a small notch therein, as with the above noted method. Then, one of the clamping elements is moved in a longitudinal direction to stress the fiber optic element in straight tension at the location of the groove or notch.

Another prior art technique for cleaving a fiber optic element has been to arrange two electrodes on opposite sides of the fiber optic element and apply a potential thereto to circumscribe a groove in the element by erosion. However, such a technique is very complex, is somewhat more dangerous in view of the fact that an electric arc is used, further has resulted in variable discoloration of the element and further still, might possibly weaken the fiber optic element.

SUMMARY OF THE INVENTION

The present invention overcomes the above noted limitations and difficulties with respect to prior art methods and tools by providing a rapid, convenient, inexpensive, and reliable method and means for use in cleaving fiber optic elements into first and second portions. According to the method of the present invention, grooving means are first caused to traverse essentially about the entire circumference of the fiber optic element to form a circumferential groove therein. Next, the fiber optic element is stressed in the vicinity of the groove in order to produce a clean failure thereat which will result in a clean, highly mirrored end surface for the cleaved element.

The tool in accordance with the present invention which is useful in cleaving fiber optic elements comprises support means having a longitudinal axis for supporting the fiber optic element therealong, grooving means for grooving the surface of a fiber optic element and means for mounting the grooving means to revolve about the longitudinal axis of the support means to groove essentially the entire circumference of the fiber optic element. Once such a groove is formed in the fiber optic element, the fiber optic element may be stressed, such as for example by pulling of one end of the fiber optic element, to cleave the element into first and second portions and thereby producing a clean, mirrored end surface.

Thus, in accordance with the present invention, essentially the entire circumference of a fiber optic element is grooved with a grooving means, such as for example a scribing or cutting element or a heated wire tip, to produce a circumferential groove. This will precisely define the orientation of the plane of the end surface relative to the longitudinal axis of the fiber optic element since the entire groove will define the plane along which the fiber optic element will fail when stressed. This is to be contrasted with the prior art scribing methods in which only a portion of the surface of the element was scribed. On the other hand, by positively moving a grooving tool about the circumference of the fiber optic element (as opposed to applying a potential to two electrodes to circumscribe the element by an arc erosion), the depth of the groove can be easily and accurately controlled, as well as the path of the groove. Furthermore, the disadvantages of discoloration and possible weakening of the fiber, as well as the complex nature of the arc erosion process, is avoided.

According to a preferred aspect of the present invention, the fiber optic element is supported at first and second spaced longitudinal positions along the length of the fiber optic element, and the grooving tool is moved about the circumference of the element at a third position located between the first and second support positions. Further, the fiber optic element is preferably deflected at the third position and the grooving tool revolves about the circumference of the deflected portion of the fiber optic element. This serves to provide a self-compensating feature in that a somewhat deeper groove is formed for thicker fiber optic elements, whereas a somewhat lesser depth groove is formed for thinner fiber optic elements.

In accordance with the preferred embodiment for the tool of the present invention, the tool includes an auxiliary support member for engaging the fiber optic element to move it into engagement with the grooving means which is displaced from the longitudinal axis of the support means. Preferably, the auxiliary support member includes a pair of spaced legs for engaging the fiber optic element and moving it into engagement with a grooving element positioned between the spaced legs.

According to a further preferred embodiment indicator means are provided for positively indicating that the grooving means has traversed about the entire circumference of a fiber optic element.

These and further features and characteristics of the present invention will be apparent from the following detailed description in which reference is made to the enclosed drawings which illustrate the preferred embodiments of the present invention.

DETAILED DESCRIPTION OF THE PREFERRED EMBODIMENT

Figures 1, 5, 6:
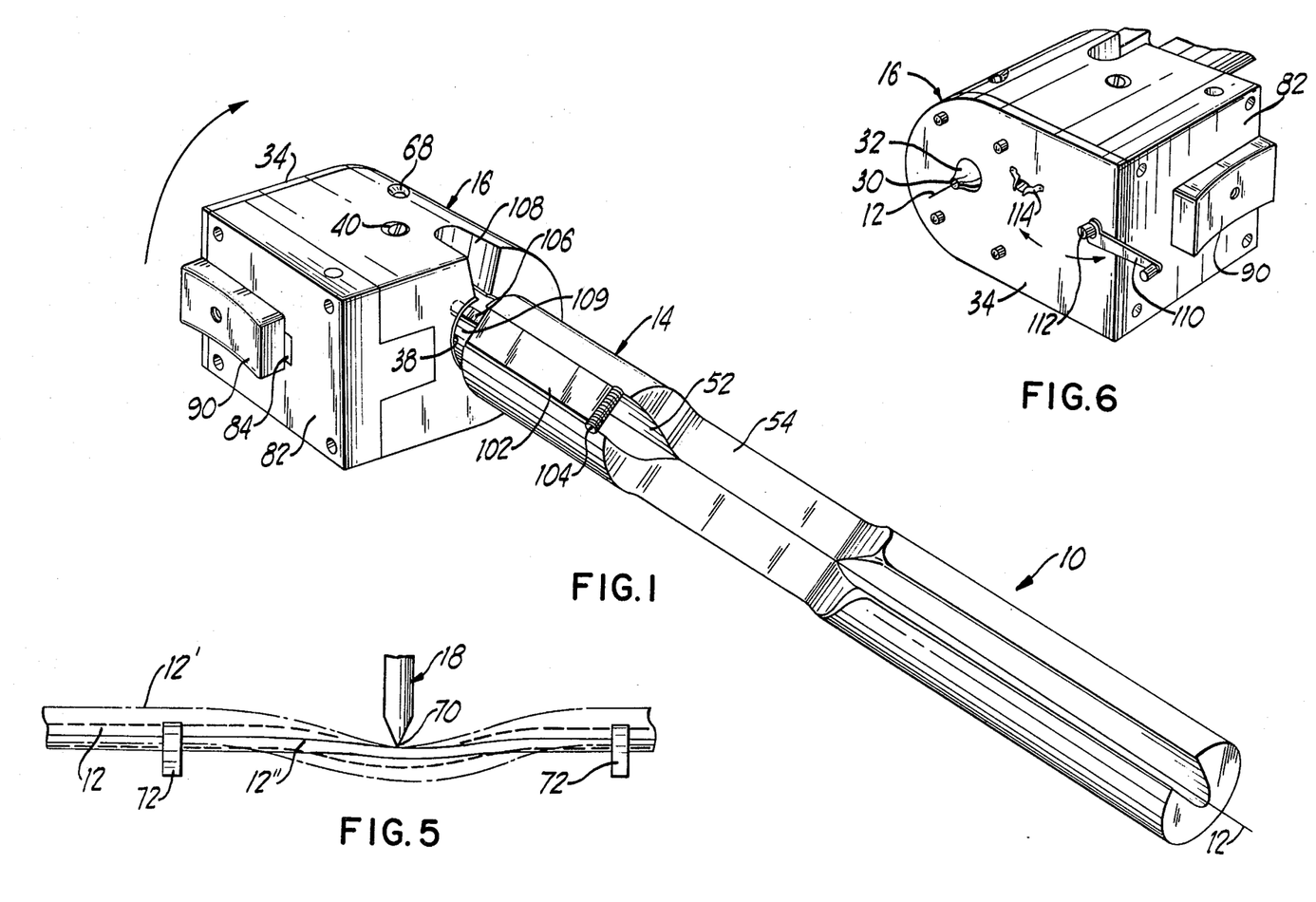
FIG. 1 is a perspective view of the grooving tool in accordance with the present invention.
FIG. 5 is a schematic elevational view, greatly enlarged for clarity, showing how a variety of different sized fiber optic elements are deflected with use of the grooving tool of the present invention.
FIG. 6 is a perspective view of the housing of the grooving tool in accordance with the present invention.
Figure 2:
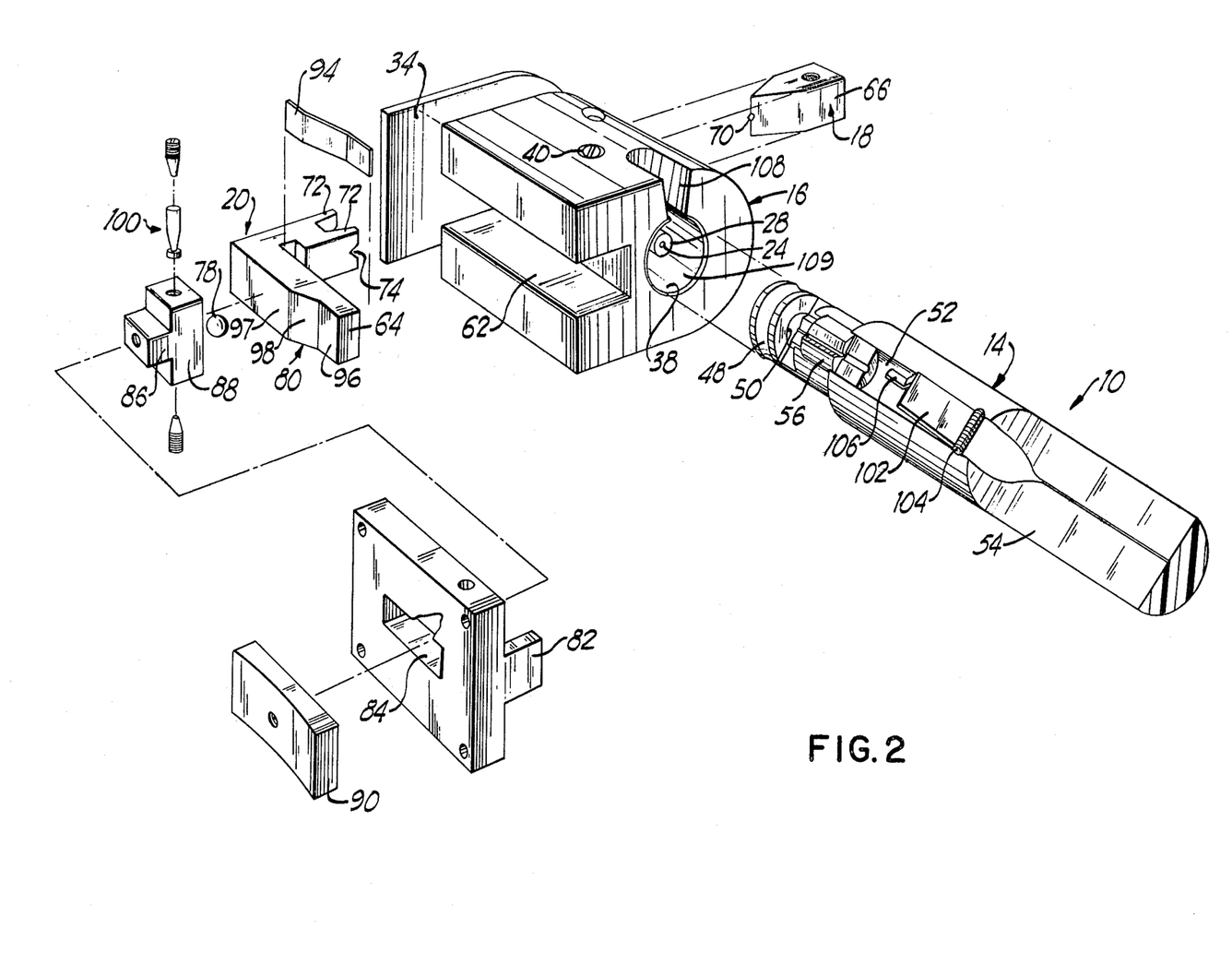
FIG. 2 is an exploded perspective view of the grooving tool of the present invention illustrating the various components thereof.
Figures 3, 4, 7:
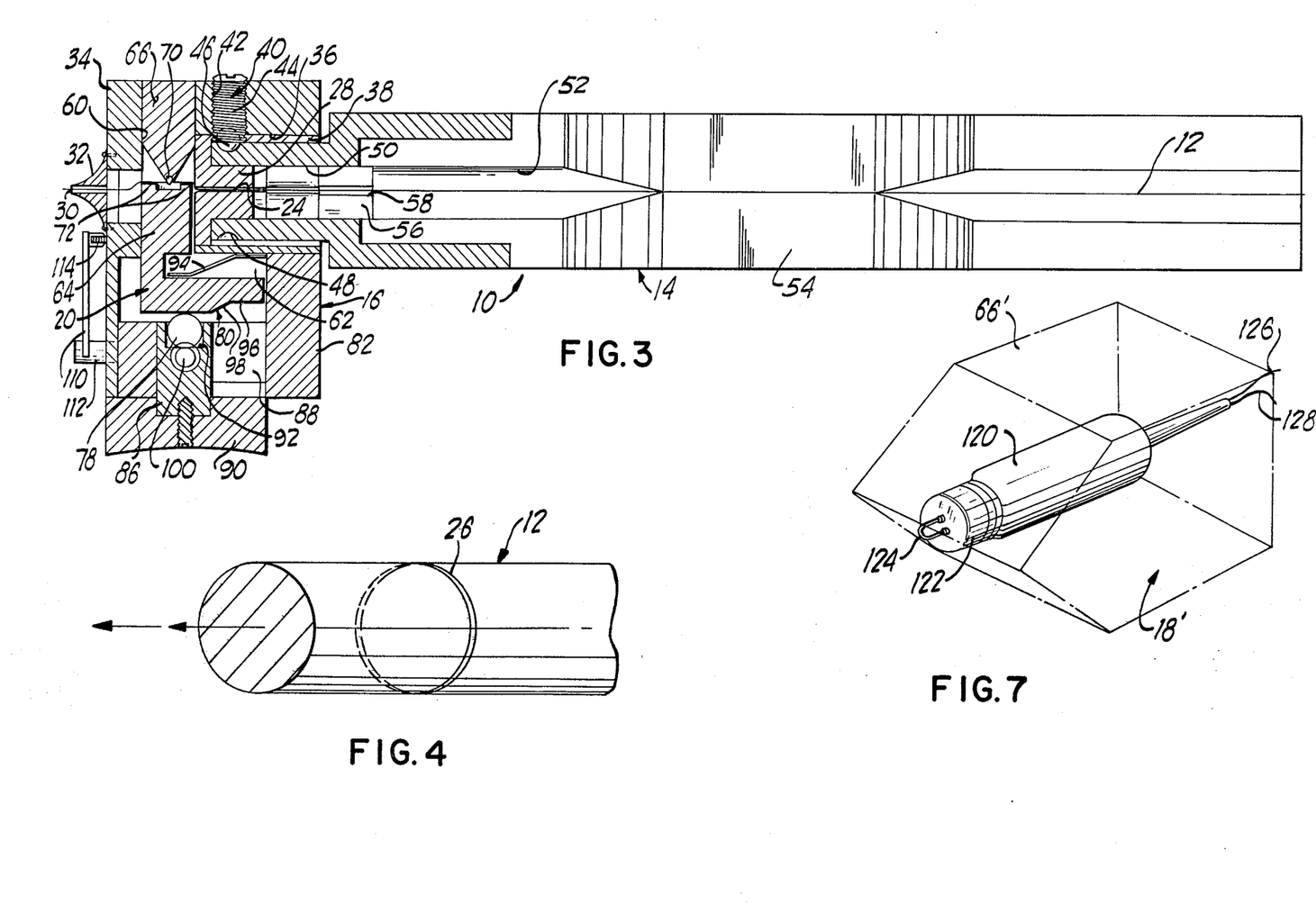
FIG. 3 shows a longitudinal cross-sectional view of the grooving tool of the present invention.
FIG. 4 is a perspective view of a fiber optic element in which a groove has been formed in the circumference thereof, illustrating how stress may be applied to the fiber optic element in the vicinity of the groove.
FIG. 7 is a perspective view of an alternative embodiment of the grooving element used in the tool of the present invention.

Referring now to the drawings in which like reference characters represent like elements, there is shown in FIGS. 1-3 a grooving tool 10 constructed in accordance with the present invention which may be used in cleaving of fiber optic elements 12 preparatory to a splice or joining of two such elements. The grooving tool 10 comprises generally an elongated support handle 14 and a housing 16 removably rotatably mounted on one end thereof. The housing 16 includes generally a grooving element 18 and an engagement causing means 20 for moving of a fiber optic element 12 inserted into the housing 16 into engagement with the grooving element 18. In operation, a fiber optic element 12 to be cleaved is inserted through an appropriate opening in the forward end of the elongated support handle 14 to pass through an aligned opening in the housing 16 and to extend therebeyond. A portion of the fiber optic element 12 within the housing 16 is then moved into engagement with the grooving element 18 and the housing 16 rotated relative to the elongated handle 14 for a full 360° while at the same time the element 12 is held against rotation (such as for example by placement of a thumb of an operator thereon) to form a circumferential groove 26 in the surface of the element 12 (see FIG. 4). The end of the fiber optic element 12 protruding through the end of the housing 16 opposite from the elongated handle 14 may then be simply pulled away from the housing 16, thereby severing or cleaving the fiber optic element 12 into first and second portions, each of which has a mirrored-type end surface suitable for subsequent splicing or joining thereof to another optic element or other article.

More particularly, the housing 16 includes a guide tube 28 having a central longitudinally extending opening 24 therethrough aligned with an opening 30 in an end support member or snout 32 mounted on an end cover 34 secured to the end of the housing 16 remote from the elongated handle 14. The guide tube 28 is inserted into a longitudinally extending bore 36 of the housing 16 and retained therein by means of a bushing 38 which serves to lock the guide tube 28 against the end surface of the bore 36. The bushing 38 may be retained in the bore 36 by any suitable means, such as for example the threads of a series of ball plungers 40 threadably mounted in transversely oriented bores 42 accessible from the exterior of the housing 16 at suitable locations thereabout. In the particular embodiment shown, three ball plungers 40 are provided. These ball plungers 40 each include a threaded member 44 and a resiliently mounted ball member 46 which protrudes radially inward of the inner circumference of the bushing 38. The threaded members 44 are threadably connected to the bushing 38 to retain the bushing 38 in the housing 16.

These ball plungers 40 are adapted to be received in a circumferential groove 48 provided in the elongated reduced forward end of the handle 14 to retain and mount the housing 16 on the handle 14 for rotational movement about the longitudinal axis of the handle 14. As best seen in FIG. 3, the elongated reduced forward end of the handle 14 includes an inner bore 50 adapted to mate with the cylindrical outer surface of the guide tube 28 to precisely align the elongated handle 14 and the housing 16. Since the ball members 46 of the ball plungers 40 are resiliently mounted therein, the handle 14 may be "snapped" into place within the housing 16 by forcing the handle 14 therein or may be removed from the housing 16 by simply pulling the housing 16 and the elongated handle 14 apart from one another.

As best seen in FIGS. 1 and 2, the elongated handle 14 in addition to including a circumferential groove 48 at its forward end, also includes an elongated slot or recess 52 which extends from the inner bore 50 in the forward end rearwardly to a reduced portion 54 of the handle 14 and which is adapted to receive a plastic guide element 56 at the forward end. The plastic guide element 56 in turn includes an elongated slot or groove 58 which is adapted to be in alignment with the central longitudinal axis of the handle 14, and thus in alignment with the central opening 24 of the guide tube 28 in the housing 16 when the housing 16 and handle 14 are coupled together. This plastic guide element 56, and central opening 24 in the guide tube 28 thus provides a suitable support for a fiber optic element 12 to be cleaved in which the fiber optic element 12 is simply and easily guided into and through the slot 58 in the guide element 56, pushed towards the housing 16, through the opening 24 in the guide tube 28 and then beyond the end of the housing 16 and the snout 32.

In suitable recesses 60, 62 provided in the end and side of the housing 16, there is provided the grooving element 18 and a fiber optic auxiliary support member 64 of the engagement causing means 20 which serves to move a fiber optic element 12 inserted into the housing 16 into engagement with the grooving element 18. As best seen in FIGS. 2 and 3, the grooving element 18 comprises a block or shank 66 adapted to be inserted in a recess 60 in the end surface of the housing and adjacent the enlarged end of the guide tube 28, and held thereinplace by means of a suitable set screw 68. In the preferred embodiment, a scribing element 70, such as for example a diamond or other hard metal cutting element having a chisel edge, is mounted at the innermost end of the shank 66 for scribing or scoring the surface of the fiber optic element 12 moved into engagement therewith as the housing 16 is rotated relative to the handle 14 (and thus relative to the fiber optic element 12).

The engagement causing auxiliary support member 64 is mounted for transverse movement relative to the longitudinal axis of the housing 16. In the preferred embodiment, this auxiliary support member 64 comprises a bifurcated support block. The bifurcated support member 64 includes a pair of spaced upstanding legs 72 each having a V-shaped notch 74 in the end surface thereof facing the grooving element 18. These V-shaped notches 74 serve to engage the fiber optic element 12 and to move same toward the grooving element 18 and into engagement therewith. The notches may, alternatively, be U-shaped or any other convenient shape.

This movement of the bifurcated support member 64 is accomplished through movement of a switch member having a ball bearing 78 adapted to ride along the rear camming surface 80 of the bifurcated support member 64. More particularly, the housing 16 includes a side cover 82 having an elongated slot 84 through which a raised shoulder 86 of a ball support member 88 extends outwardly from within the housing 16. A thumb switch 90 is threadably secured to this raised shoulder 86 on the outside of the housing 16 so that relative longitudinal movement of the thumb switch 90 serves to move the ball support member 88 longitudinally relative to the housing 16. On the surface adjacent the bifurcated support member 64, the ball support member 88 includes an appropriate recess 92 for receiving the ball bearing 78 which is adapted to roll along the rear camming surface 80 of the bifurcated support member 64. A leaf spring 94 is provided between the bifurcated support member 64 and an inner wall of the recess 62 in the side of the housing 16 for normally biasing the bifurcated support member 64 in a direction away from the longitudinal support axis of the housing 16 (i.e., in a direction towards the ball support member 88). The rear camming surface 80 of the bifurcated support member 64 includes a pair of offset, positioning surfaces 96, 97 joined by an inclined surface 98. When the ball bearing 78 rides along the reduced positioning surface 96, the leaf spring 94 serves to bias the bifurcated support member 64 to a nonengagement causing position away from the longitudinal axis of the elongated handle 14 along which the fiber optic element 12 is to be supported so that the fiber optic element 12 may be easily inserted into the housing 16 without interference. By movement of the thumb switch 90 longitudinally tpward the snout end of the housing 16, the ball bearing 78 rides along the inclined surface 98 and then the second positioning surface 97, thereby forcing the bifurcated support member 64 against the leaf spring 94 into an engagement causing position and holding it thereinposition.

A lock set mechanism 100 is threaded in a transverse bore of the ball support member 88 in the vicinity of the recess 92 for the ball bearing 78. Thus, as can be appreciated, by virtue of the lock nature of the set mechanism 100, the extent that the ball 78 extends out from the surface of the ball support member 88 can be varied which thus varies the positioning of the bifurcated support member 64 vis-a-vis the grooving element 18.

After a fiber optic element 12 has been inserted into the housing 16 and the bifurcated support member 64 moved to its engagement causing position by movement of the switch member 90, the housing 16 may be simply rotated relative to the elongated handle 14 (and relative to the fiber optic element 12 supported thereby) a full 360° to scribe a circumferential groove 26 in the surface thereof. After such a groove 26 has been formed, the end of the fiber optic element 12 protruding through the snout 32 may be simply pulled away from the housing 16, thus causing the fiber optic element 12 to fail at the location of the groove 26 and thereby result in a clean mirror type surface suitable for subsequent splicing and/or joining of the fiber optic element 12 to another fiber optic element or suitable article.

In this regard, it is to be noted that the formation of a groove 26 about the entire circumference precisely and accurately defines the plane of failure and thus the plane of the end surface which preferably will be perpendicular to the longitudinal axis of the fiber optic element 12. This is schematically represented in FIG. 4 which illustrates a fiber optic element 12, greatly enlarged, having a groove 26 formed therein and in which the end of the element 12 may be moved in the direction of the arrow (while the other end is fixedly held) to cause failure at the location of the groove 26. As will be appreciated, because of the very small nature of the fiber optic elements, the amount of force required in causing failure of the fiber optic element is minimal. Thus, the function of the groove 26 is simply to define the location and plane of failure, and not necessarily to cause the failure itself. Further in this regard, it has been found that it is not necessary with the method and tool of the present invention to remove the protective cladding or lacquer which often surrounds the core of the fiber optic elements prior to the formation of the grooves 26 in the surface of the element 12.

With regard to the formation of the groove 26 about the entire circumference, there is provided in accordance with the preferred embodiment of the present invention a device for precisely indicating and ensuring a full 360° relative rotation of the housing 16 with respect to the elongated support handle 14. This indication means comprises an elongated indicator member 102 pivotally mounted to the elongated handle 14 to pivot about the axis transverse to the direction of the longitudinal axis of a handle 14, and spring biased by a torsion spring 104 to pivot the end of the indicator 102 away from the elongated handle 14. The biased indicator member 102 includes a tip 106 at its end remote from the pivot point which is adapted to be moved (when in a proper orientation) through a radially extending slot 108 in the housing 16 and the bushing 38 into the cylindrical recess 109 defined inwardly of the bushing 38. This for example can best be seen in FIGS. 1 and 2.

After the housing 16 has been mounted onto the elongated handle 14 and a fiber optic element 12 inserted therethrough and moved into engaging position with the grooving element 18, the indicator member 102 may be pushed toward the handle 14 against the biasing force of the spring 104 so that the tip 106 passes through the radial slot 108 into the cylindrical recess 109 in the housing 16. The housing 16 may then be rotated relative to the handle 14. During this rotation, as soon as the edge of the slot 108 passes beyond the tip 106, the force moving it into place (such as for example the thumb of the operator) may be removed and the indicator member 102 will be retained in the recess 109 during the rotation of the housing 16 until the housing 16 has been rotated to a position in which the radial slot 108 is again aligned with the tip 106 (i.e., after 360° of relative rotation). When this occurs, the indicator member 102 will be released from the recess 109 and spring upwardly through the slot 108 away from the handle 14, thereby indicating that the housing 16 has rotated 360° relative to the handle 14. Accordingly, this positively indicates to the operator of the tool 10 that a groove 26 has been formed about the entire circumference of the fiber optic element 12 so that the end of the element 12 may then be stressed to cleave the element.

It is to be noted that the arrangement of the grooving tool 10 shown in FIGS. 1-3, in which a bifurcated support member 64 serves to move the fiber optic element into engagement with the grooving element 18, produces a self-compensating feature for the tool 10 with respect to the formation of grooves in different sized fiber optic elements. More particularly in this regard, it will be appreciated that the score depth of the groove 26 formed in any fiber optic element 12 is dependent on the pressure applied by the grooving element 18 and the sharpness of the cutting edge thereof. For a given pressure, the sharper the cutting edge, the deeper the score, and for a given cutting edge, the greater the pressure, the deeper the score. Assuming a fixed spacing between the bifurcated support member 64 and the grooving element 18 (which spacing can be adjusted in the manner noted above), it will be appreciated that the pressure applied by the grooving element 18 is dependent on the thickness of the fiber optic element 12. This can be seen schematically in FIG. 5 which shows on a greatly enlarged scale, a number of different sized fiber optic elements 12, 12', 12'' supported on the spaced support legs 72 of the bifurcated support member 64.

If we assume that the element is initially supported by the two legs 72 to lie in a straight line, as the bifurcated support member 64 is moved toward the grooving element 18 and the grooving element 18 engages the fiber optic element 12 in a position between the two legs 72, the fiber optic element 12 will be slightly deflected in a direction away from the grooving element 18. As shown in FIG. 5, the amount of which is dependent upon the thickness of the fiber optic element 12. Thus, for larger diameter fiber optic elements (see element 12'), the degree of deflection is greater whereas for thinner fiber optic elements (12''), the degree of deflection is less than for the element 12 shown in FIG. 5.

Because the fiber optic elements 12 have a certain resistance to deflection, this deflection caused by moving the support member 64 into the engaging position governs the pressure or force on the fiber optic element 12 applied by the grooving element 18. This pressure in turn controls the score depth. Thus, for the thicker fiber optic elements 12', the amount of deflection is greater as is the resistance to deflection, and thus, the pressure and the depth of the score will be greater, whereas for lesser thickness of fiber optic elements 12'', the deflection, the pressure, and the score depth will be less. Accordingly, it will be appreciated that this arrangement is self-compensating in that the score depth will be greater for thicker fiber optic elements (i.e., 12') than for thinner fiber optic elements (i.e., 12''), thus ensuring an adequate depth of score for the groove 26 to produce a failure along the plane of the groove when the fiber optic element 12 is stressed.

In this regard, it is to be noted that the desired score depth is dependent upon the type and diameter of the material used, but is preferably approximately 5% of the fiber diameter. Further, the spacing between the support legs 72 is on the order of 0.1 inches, but this dimension is not critical. In this regard, it is to be noted that increasing the spacing between the legs 72 tends to increase the arc of the fiber optic element 12 (i.e., the radius of curvature will increase), whereas decreasing the spacing tends to decrease the arc. This in turn, depending on the amount of change in the spacing, causes changes in the resistance to deflection when the fiber optic element 12 is moved into engagement with the grooving element 18.

As best seen in FIG. 6, the end of the housing 16 remote from the elongated handle 14 is provided with a handle 110 pivoted on a pin 112 to swing between an open position and a closed position (FIG. 3) in which it is adapted to be held thereinplace by a suitable locking device 114. When the handle 110 is in its open position, it thus serves as a convenient means by which an operator may rotate the housing 16 about the axis of the handle 14. Alternatively, the housing 16 may simply be rotated by hand without any additional means such as provided by the handle 110 shown in FIG. 6.

FIG. 7 shows an alternative form for the grooving element 18 which is adapted to traverse about the circumference of a fiber optic element 12 to form a groove 26 therein. In this embodiment, the grooving element comprises a heated grooving element 18' which is adapted to engage the surface of the fiber optic element 12 to form a groove 26 therein as the housing 16 is rotated about the axis of the handle 14. The heated grooving element 18' includes a heating element housing 120, such as for example made of plastic, having a ceramic forward end 122 and a looped wire element 124 extending therefrom. The opposite ends of the wire 124 are connected through suitable resistor loads to an electrical supply, such as via leads 126, 128, which serve to heat the wire element 124 to a high temperature, such as for example 800°-900° C. which will then form a groove 26 in the fiber optic element 12 when the fiber optic element is engaged thereby. In this regard, the heating element housing 120 is mounted in the shank 66' in any suitable manner, and the shank 66' is then mounted in proper position in the housing 16. The electrical leads 126, 128 for the wire element 124 may be connected to any suitable source of supply as is conventional in any resistance heating means. This alternative arrangement for forming a groove in a fiber optic element 12 may thus be suitable for certain types of fiber optic elements 12, or where diamond or hard metal cutters are not available or are not economical to operate.

Figure 10:
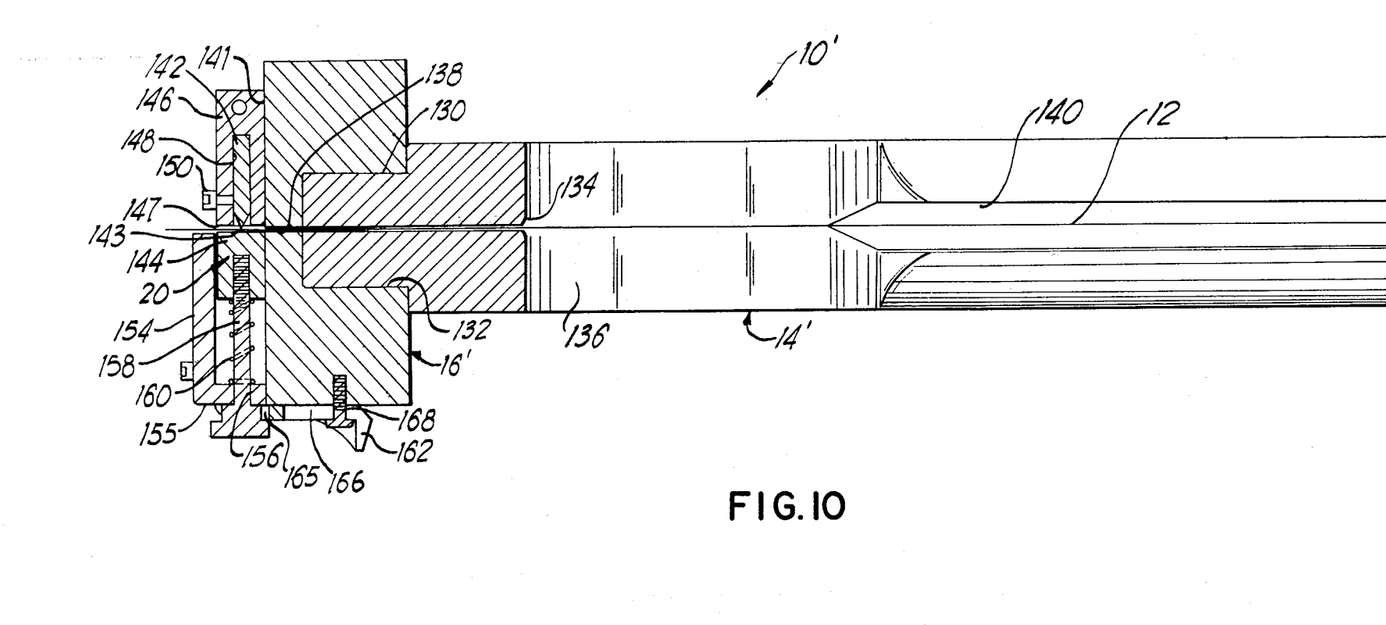
FIG. 10 is a longitudinal cross-sectional view of the grooving tool of FIG. 8.

Turning now to FIGS. 8-11, there is shown therein an alternative grooving tool 10' for forming a groove 26 in a fiber optic element 12 which is constructed in accordance with the broad principles of the present invention. This alternative grooving tool 10' is the subject of a separate application filed on even date herewith in the name of Rocco F. Basile and entitled "Improved Tool For Use in Cleaving Fiber Optic Elements," but which embodies the broad principles in accordance with the present invention. In particular, this alternative embodiment 10' comprises a housing 16' and an elongated handle 14' for supporting a fiber optic element 12 and for supporting the housing 16' for relative rotation. The elongated handle 14' includes a reduced cylindrical portion 130 which is adapted to be inserted into a cylindrical bore 132 in the housing 16'. As best seen in FIG. 10, the cylindrical bore 132 substantially conforms to the cylindrical surface of the reduced forward end 130 of the handle 14' so as to be freely rotatable relative thereto. A small central bore 134 extends from a recessed portion 136 of the handle 14' forwardly through the reduced front end 130. This small bore 134 is adapted to be in precise alignment with the central fiber optic element receiving bore 138 of the housing 16' coaxially aligned with the enlarged bore for the forward end 130 of the handle 14'. The rearward end of the handle includes an elongated slot 140 on which the fiber optic element 12 is adapted to rest.

In this alternative embodiment, the housing 16', again supports a grooving element 142 in opposing relationship to an auxiliary support member 144 which is adapted to be movable relative to the grooving element 142 to move the fiber optic element 12 into engagement therewith. As with the embodiment shown in FIGS. 1-3, the grooving element 142 preferably comprises a diamond or hard metal cutting or scoring element having a chisel edge supported in a shank 146 which in turn is mounted in the housing 16' in fixed relationship with respect to the the fiber optic element receiving bore 138. For example, the grooving element 142 is mounted in a recessed bore 148 of the shank 146 by means of a set screw 150.

In this alternative embodiment, the auxiliary support member 144 for causing engagement of the fiber optic element 12 with the grooving element 142 comprises a support block having a V notch 157 in the end surface thereof facing the grooving element 142 and which is spring biased towards the engagement causing position. This biasing is accomplished by means of an L-shaped cover member 154 adapted to be secured to the housing 16', such as with means of screws, and having a bore 156 in one leg 155 thereof through which a threaded screw member 158 is adapted to pass and threadably engage the support block 144. A coiled spring 160 is provided coaxially mounted on the threaded screw 158 between the support block 144 and the leg 155 of the cover 154. The coil spring 160 thus serves to force the block 144 toward the grooving element 142. To move the support block 144 to the non-engaging position to allow for easy insertion of a fiber optic element 12, there is provided a camming member 162 having a pair of spaced legs 164 defining a first slot 165 in the end thereof, and having a second slot 166 through which a mounting screw 168 passes and is threadably secured to the housing 16' to allow for relative sliding movement of the camming member 162. The pair of spaced legs 164 are each inclined so as to be adapted to engage the head of the threaded screw 158 to cam the screw 158 outwardly and away from the cover leg 155 when slid toward the end of the housing 16'. That is, the inclined legs 164 of the camming member 162 engage the enlarged head of the threaded screw 158 and force same away from the cover leg 155. Retraction of the camming member 162 serves to release the screw 158 to be under the influence of the biasing spring 160 to force the support block 144 toward the engagement causing position.

Thus, in accordance with this embodiment, the engagement causing auxiliary support member 144 is normally biased toward the engaged position but is movable to a non-engaging position to allow for easy insertion of a fiber optic element 12 into and through the housing 16' by movement of the camming member 162 toward the free end of the housing 16'. When a fiber optic element 12 has been positioned in the elongated handle 14' and inserted through the housing 16', the camming member 162 is moved to its release position, thereby allowing the support block 144 to move the fiber optic element 12 into engagement with the grooving element 142. The housing 16' may then be rotated about the elongated handle 14' to form a groove 26 about the entire circumference of the fiber optic element 12. The fiber optic element 12 may then be simply stressed in the vicinity of the groove 26, such as for example by pulling the protruding portion outwardly in a direction away from the elongated handle 14' to cause failure along the plane defined by the groove 26 to provide a smooth, mirror-type finished end surface. It is to be noted that in this embodiment in which the support block 144 is not bifurcated, there is no deflection of the fiber optic element 12 at the location of engagement with the grooving element 142 since the fiber optic element 12 is continuously supported between the ends of the support block 144.

Figures 8, 11:
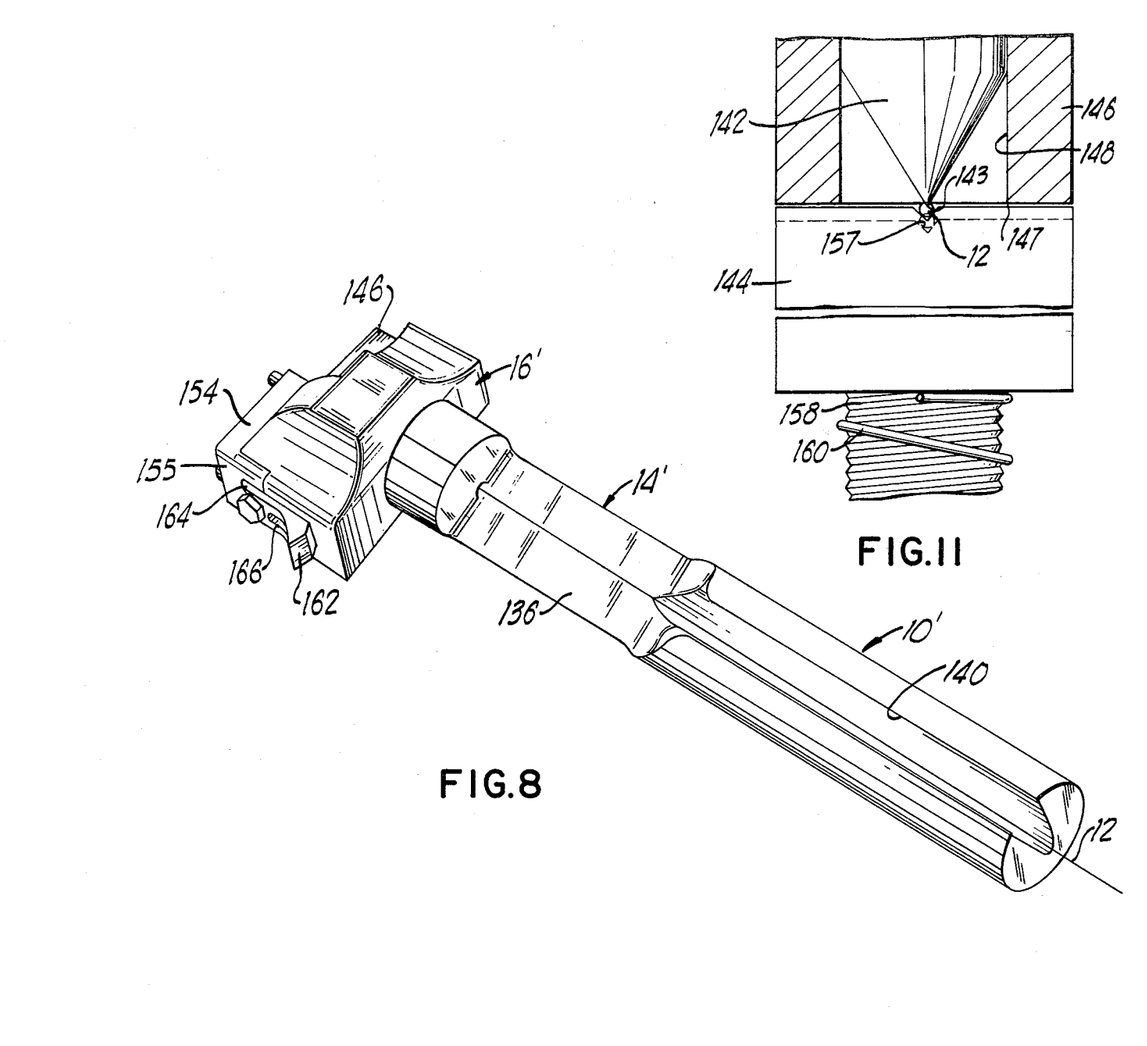
FIG. 8 is a perspective view of an alternative embodiment of the grooving tool constructed in accordance with the broad principles of the present invention.
FIG. 11 is an enlarged cross-sectional view of the grooving element and the fiber optic element engagement causing block showing the block in an engaging position, and in dotted outline, in a disengaged position.
Figure 9:
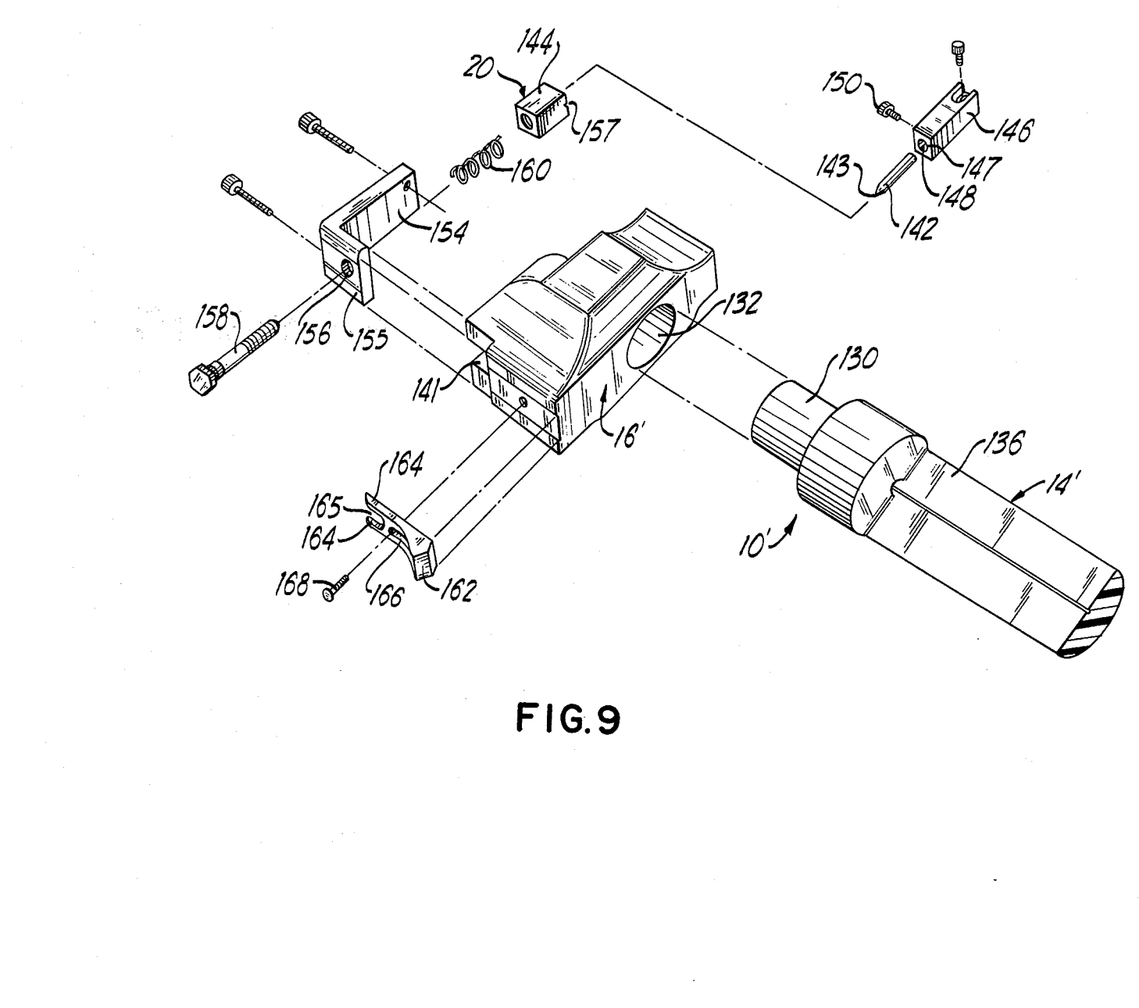
FIG. 9 is an exploded perspective view of the grooving tool shown in FIG. 8.

As best seen in FIG. 11, the V-shaped notch in the block 144 has a depth which is less than the diameter of the fiber optic element 12 to be grooved. When the fiber optic element 12 is moved into engagement with the grooving element 142, the bottom surface 147 of the shank 146 provides a stop for movement of the support block 144. For comparison purposes, the dotted outline in FIG. 11 shows the position of the support block 144 in the non-engaging position. Thus, by precisely controlling the distance that the tip 143 of the grooving element 142 extends beyond the end surface 147 of the shank 146, the depth of the groove for all fiber optic elements 12 can be precisely controlled. That is, if it is desired that the score depth for any fiber optic element not be any greater than say two microns, then the tip 143 of the grooving element 142 can be set to extend beyond the end surface 147 of the shank 146 only two microns, and the depth of the groove 26 in the fiber optic element 12 will never be any larger than this depth, namely two microns. Further, with the force of the coil spring 160 large enough to maintain the fiber optic element 12 in engagement with the end surface 147 of the shank, the depth of the groove will be precisely equal to the extent that the tip 143 extends beyond the end surface 147 of the shank—namely, two microns in the example above. This is advantageous in ensuring that the depth of the groove 26 to be formed in the fiber optic element is not any greater than necessary to ensure that the fiber optic element 12 will fail along the plane of the groove 26 when stressed, and also in preventing overcutting which might otherwise cause the fiber optic element 12 to have a hackled or spurred surface.

Thus, it can be seen that in accordance with this second preferred form, no deflection of the fiber optic element 12 in the vicinity of the groove 26 occurs when the fiber optic element 12 is moved into engagement with the grooving element 142. In this regard, the spring 160 biasing force serves to provide the pressure necessary for ensuring that the depth of cut corresponds to the amount of extension of the tip 143 beyond the end surface 147 of the shank 146.

Of course, the other features discussed with reference to the embodiment shown in FIGS. 1–3 and 6, could also be provided in the alternative embodiment shown in FIGS. 8–11. For example, ball plungers 40 could be provided for engagement in an appropriate circumferential groove in the elongated handle 14' for rotatably mounting the housing 16' on the elongated handle 14' and for providing a biasing means for retaining the housing 16' on the handle 14'. Also, indicator means 102 could be provided for indicating and ensuring positively that 360° of rotation is obtained. Additionally, a handle 110 could be provided for rotating the housing relative to the elongated handle 14'. Further, the alternative grooving element 18' depicted in FIG. 7 could be employed in place of the grooving element.

Further, with respect to either the embodiment shown in FIGS. 1–3 or FIGS. 8–11, it is of course possible that positive holding means could be provided for holding the fiber optic element 12 in the elongated handle 14, 14' instead of using the operator's thumb.

Thus, it is seen that in accordance with the present invention, there is provided a new and improved method for cleaving of fiber optic elements 12 and a new and improved tool 10, 10' useful in such cleaving of fiber optic elements. In this regard, it is to be noted that the tool 10, 10' in accordance with the present invention is particularly useful for field operation wherein it is necessary to cleave fiber optic elements 12 for subsequent splicing. The tool provides a simple relatively inexpensive yet reliable, convenient and rapid means for forming a groove 26 about the entire circumference of a fiber optic element 12 which may then be stressed in accordance with the method of the present invention to sever the fiber optic element 12 to provide a clean, mirror type end surface.

While the preferred embodiments of the present invention have been shown and described, it will be understood that such are merely illustrative and that changes may be made without departing from the scope of the invention as claimed.

What is claimed is:

1. A tool for use in cleaving a fiber optic element into first and second portions, said tool comprising:
    support means including an elongate handle for supporting along its longitudinal axis a fiber optic element;
    grooving means for forming a groove in the surface of said fiber optic element;
    engagement causing means for causing engagement of said grooving means with a fiber optic element supported by said handle;
    a housing for supporting said grooving means and said engagement causing means; and
    mounting means for rotatably mounting said housing and thereby said grooving means on said handle, said mounting means including a circumferential groove in said handle, a recess in said housing and ball members in said recess and engaging said circumferential groove for supporting and retaining said housing for relative rotational movement about the axis of said handle.

2. The tool of claim 1 wherein said engagement causing means is movable between a first position in which said grooving means is adapted to engage the fiber optic element and a second position in which said grooving means is adapted to be spaced from said fiber optic element.

3. The tool of claim 2 wherein said grooving means is offset from said longitudinal axis of said support means and wherein said engagement causing means comprises an auxiliary support member having a supporting portion for supporting said fiber optic element along a portion of its longitudinal length, and means for movably mounting said auxiliary support member for movement in a direction transverse to said longitudinal axis of said support means between said first and second positions, said auxiliary support member when in said second position having its supporting portion in alignment with said longitudinal axis of said support means and said auxiliary support member when in said first position having its supporting portion offset from said longitudinal axis of said support means in a direction towards said grooving means.

4. The tool of claim 3 wherein said auxiliary support member comprises a pair of spaced legs each having a groove for engaging the fiber optic element at spaced positions along the length thereof, said grooves being aligned with the longitudinal axis of said support means when in said second position.

5. The tool of claim 4 wherein said grooving means is spaced a first distance from said longitudinal axis of said support means and wherein said grooves are spaced from said longitudinal axis a second distance when in said first position, the difference between said first and second distances being less than the thickness of a fiber optic element to be cleaved.

6. The tool of claim 3 wherein said means for movably mounting said auxiliary support member comprises bias means normally biasing said auxiliary support member into said second position and camming means movable to cam said auxiliary support member towards said first position against said bias means.

7. The tool of claim 6 wherein said camming means comprises a camming surface on said auxiliary support member and a switch member mounted on said housing for sliding movement relative thereto, said switch member being in engagement with said camming surface.

8. The tool of claim 1 wherein said means for rotatably mounting said housing on said support means comprises means for removably rotatably mounting said housing on said support means.

9. The tool of claim 1 wherein said housing includes guide means aligned with said longitudinal axis of said support means when said housing is mounted on support means for aligning a fiber optic element relative to said auxiliary support member.

10. The tool of claim 1 wherein said housing includes a support element aligned with said longitudinal axis of said support means when said housing is mounted on said support means for supporting the end of a fiber optic element extending from said support means through said housing.

11. The tool of claim 1 further including indicator means for positively indicating a relative rotation of substantially 360° between said housing and said support means.

12. The tool of claim 11 wherein said indicator means comprises a recess in said housing coaxially aligned with said longitudinal axis of said support means, a slot extending transversely of said recess in said housing, and an indicator member mounted on said support means for movement about an axis transverse to the direction of said longitudinal axis of said support means between a first indicating position in which said indicator member is adapted to extend into said recess of said housing and a second indicating position in which said indicator member is spaced from said recess, said indicator member being biased toward said second indicating position and movable from said second indicating position to said first indicating position by passing through said slot in said housing so that said indicator member is retained in said first indicating position during relative rotation of said housing with respect to said support member unless said indicator member is aligned with said slot in said housing.

13. The tool of claim 1 wherein said grooving means comprises a scribing element having a scribing edge for engagement with the surface of a fiber optic element mounted within said housing in a position spaced from said longitudinal axis of said support means.

14. The tool of claim 1 wherein said grooving means comprises a heating element having a heated tip for engagement with the surface of a fiber optic element.